(12) United States Patent
Choi

(10) Patent No.: US 7,651,435 B2
(45) Date of Patent: Jan. 26, 2010

(54) AUTOMATIC TRANSMISSION OF A VEHICLE

(75) Inventor: Jaehyuk Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 238 days.

(21) Appl. No.: 11/600,705

(22) Filed: Nov. 15, 2006

(65) Prior Publication Data
US 2008/0076620 A1 Mar. 27, 2008

(30) Foreign Application Priority Data
Sep. 21, 2006 (KR) .................. 10-2006-0091906

(51) Int. Cl.
*F16H 57/08* (2006.01)
(52) U.S. Cl. .................................... 475/331
(58) Field of Classification Search ................. 475/331, 475/317, 318, 346
See application file for complete search history.

(56) References Cited
U.S. PATENT DOCUMENTS

| | | | | | |
|---|---|---|---|---|---|
| 2,427,168 | A | * | 9/1947 | Thompson et al. ........... | 475/317 |
| 3,705,522 | A | * | 12/1972 | Ogawa ........................ | 475/341 |
| 3,924,490 | A | * | 12/1975 | Mills ............................ | 475/76 |
| 5,199,309 | A | * | 4/1993 | Isozumi ........................ | 74/7 E |
| 5,234,389 | A | * | 8/1993 | Goates ......................... | 475/297 |
| 5,609,542 | A | * | 3/1997 | Kusumoto et al. ........... | 475/331 |
| 5,743,139 | A | * | 4/1998 | Murata ......................... | 74/7 E |
| 6,129,648 | A | * | 10/2000 | Tanioka et al. .............. | 475/331 |
| 7,335,128 | B2 | * | 2/2008 | Flamang et al. ............. | 475/331 |
| 2002/0142878 | A1 | * | 10/2002 | Bansbach et al. ........... | 475/204 |
| 2006/0116234 | A1 | * | 6/2006 | Alfredsson .................. | 475/317 |
| 2007/0197340 | A1 | * | 8/2007 | Kim et al. .................... | 475/344 |

* cited by examiner

*Primary Examiner*—Sherry L Estremsky
*Assistant Examiner*—Erin D Bishop
(74) *Attorney, Agent, or Firm*—Edwards Angell Palmer & Dodge LLP; Peter F. Corless

(57) ABSTRACT

Disclosed is an automatic of a vehicle comprising: a rotating shaft; a sun gear included at a circumference of the rotating shaft; a plurality of pinions engaged with the sun gear and rotated along an exterior circumference of the sun gear; a ring gear configured to be rotated as inscribed with an exterior circumference of the plurality of pinions; a case forming an exterior of the automatic transmission; and a supporting unit between the ring gear and an interior circumference of the case.

7 Claims, 3 Drawing Sheets

AUTOMATIC TRANSMISSION OF A VEHICLE

CROSS-REFERENCE TO RELATED APPLICATION

This application claims priority to and the benefit of Korean Patent Application No. 10-2006-0091906 filed in the Korean Intellectual Property Office on Sep. 21, 2006, the entire contents of which are incorporated herein by reference.

BACKGROUND OF THE INVENTION (a) Field of the Invention

The present invention relates to an automatic transmission of a vehicle, and more particularly, the present invention relates to an automatic transmission with reduced overall length, weight and manufacturing cost thereof.

(b) Description

Generally, an automatic transmission is an apparatus that automatically operates a clutch and a transmission by a machine rather than a human. It rotates wheels by automatically changing rotation speed and torque created in an engine.

Particularly, as shown in FIG. 1, such an automatic transmission includes a case 10 forming an exterior of the automatic transmission and a planetary gear set 20 in the case 10. Furthermore, the planetary gear set 20 includes a sun gear 21, a plurality of pinions 23, and a ring gear 25.

In more detail, the sun gear 21 is included at an exterior circumference of a rotating shaft S. A plurality of pinions 23 are supported by a carrier (not shown in FIG. 1). and engaged with an exterior circumference of the sun gear 21, and rotated along the exterior circumference of the sun gear 21. An interior circumference of the ring gear 25 is engaged with an exterior circumference of a plurality of pinion 23, and the ring gear 25 is rotated along the exterior circumference of a plurality of pinion 23. Accordingly, when one among the sun gear 21, carrier (not shown), and ring gear 25 is fixed, rotation speed and torque transmitted to en output shaft (not shown) can be changed.

As shown in FIG 1, conventional automatic transmissions have a ring gear 25 rotatably supported around a rotating shaft S.

The ring gear 25 is rotatably supported and it needs to be prevented from moving in an axial direction. To address this problem, conventional automatic transmissions have been designed to have a structure wherein a thrust bearing 40 located around the rotating shaft S is mounted to a support flange 30 protruded from the lateral side of the ring gear 25. Particularly, the support flange 30 has a shape that is bent several times and convexes into the right in the drawings in order to prevent interferences between the support flange 30 and other components in the ring gear 25, such as the planetary gear set.

However, although the structural configuration above can prevent the axial movement of ring gear 25, it causes overall length of the automatic transmission to be longer, thereby increasing its overall weight and manufacturing cost.

There is thus still a need for an automatic transmission with reduced overall length, weight and manufacturing cost.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an automatic transmission with reduced overall length, weight and manufacturing cost.

In one aspect, the present invention provides an automatic transmission of a vehicle comprising: a rotating shaft; a sun gear located on a circumference of the rotating shaft; a plurality of pinions engaged with the sun gear and rotated along an exterior circumference of the sun gear; a ring gear configured to be rotated as inscribed with an exterior circumference of the plurality of pinions; a case forming an exterior of the automatic transmission; and a supporting unit between the ring gear and an interior circumference of the case.

In a preferred embodiment, the supporting unit is configured for the ring gear to be rotatably supported on an interior circumference of the case.

In another preferred embodiment, the supporting unit may comprise a first member located on an exterior circumference of the ring gear and a second member located on the interior circumference of the case at a position corresponding to the first member to guide rotation of the first member.

A preferred first member of the supporting unit may include, but not be limited to, a support flange formed on the exterior circumference of the ring gear.

A suitable second member of the supporting unit may include, but not be limited to, a bearing that guides smooth rotation of the support flange.

Examples of such bearing include a thrust bearing that can prevent axial movement of the ring gear. Thrust bearings, like other rotary bearings, permit rotation between parts, but they are designed to support a high axial load while doing this. Suitable thrust bearings may include, but not be limited to, ball thrust bearings, tapered roller bearings, and fluid bearings.

A preferred bearing may suitably comprise a first rotating portion located to the left side of the support flange and a second rotating portion located to the right side of the support flange.

Such bearing may further comprise a first housing located to the left side of the first rotating portion and a second housing located to the right side of the second rotating portion.

In another aspect, motor vehicles are provided that comprise a described automatic transmission.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present automatic transmission will be particularly useful with a wide variety of motor vehicles.

Other aspects of the invention are discussed infra.

Figure 1:
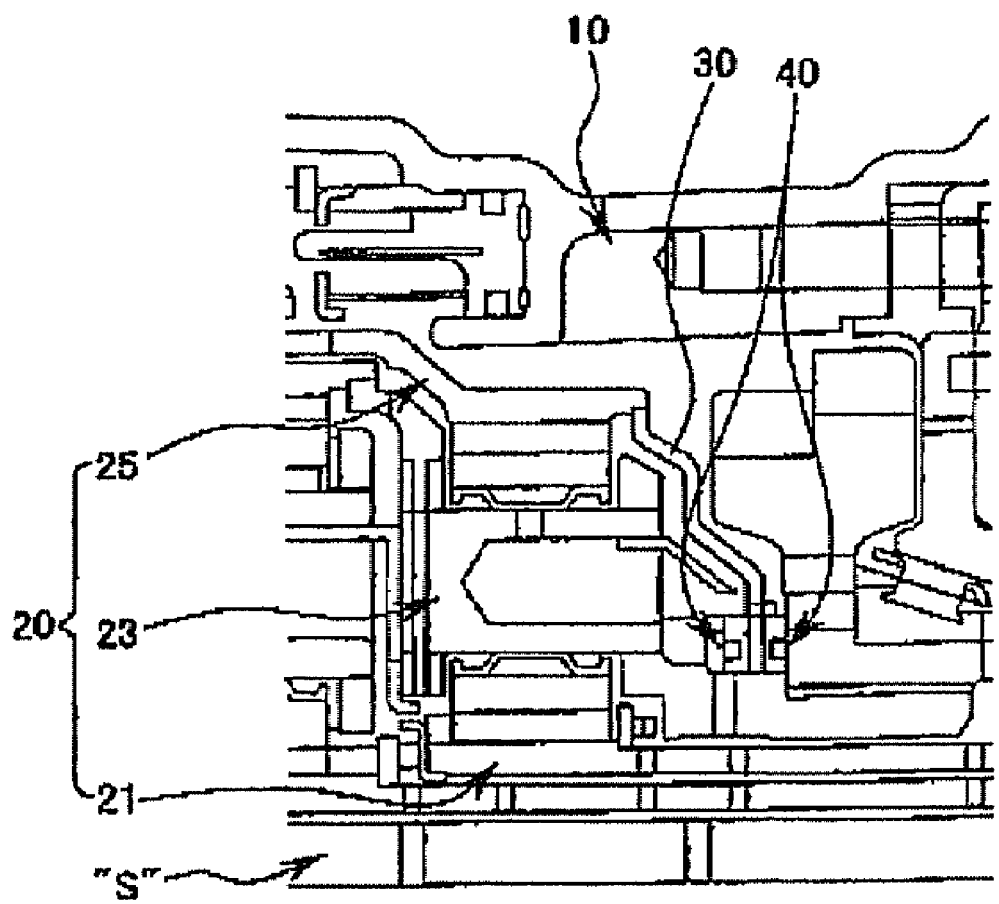
FIG. 1 is a cross-sectional view showing main components of a conventional automatic transmission of a vehicle.

Reference numerals set forth in the Drawings includes reference to the following elements as further discussed below:

20: planetary gear set
21: sun gear
23: pinion
25: ring gear
100: case
300: supporting unit
310: support flange
320: bearing

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 2:
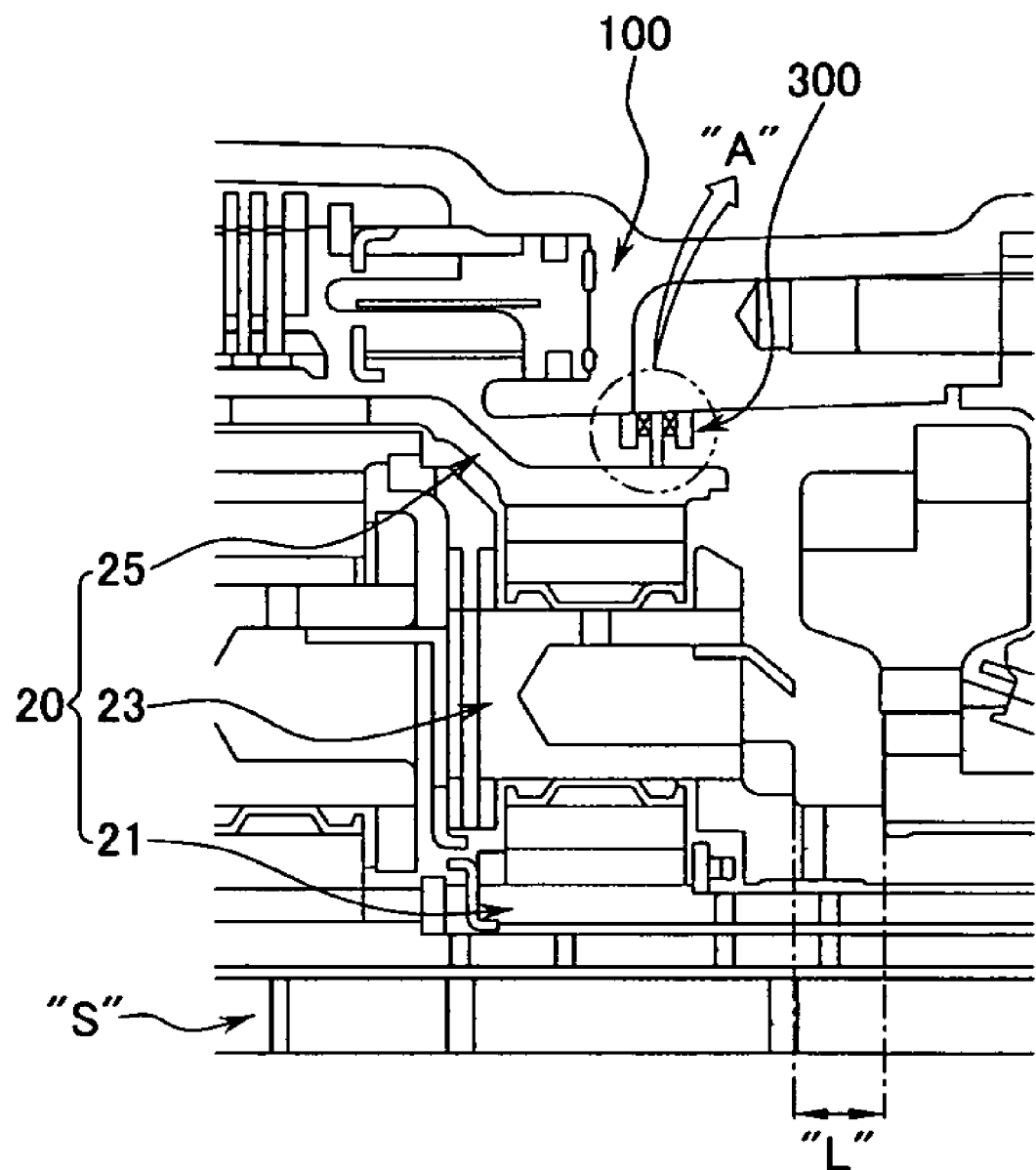
FIG. 2 is a cross-sectional view showing main components of an automatic transmission of a vehicle according to an exemplary embodiment of the present invention.
Figure 3:
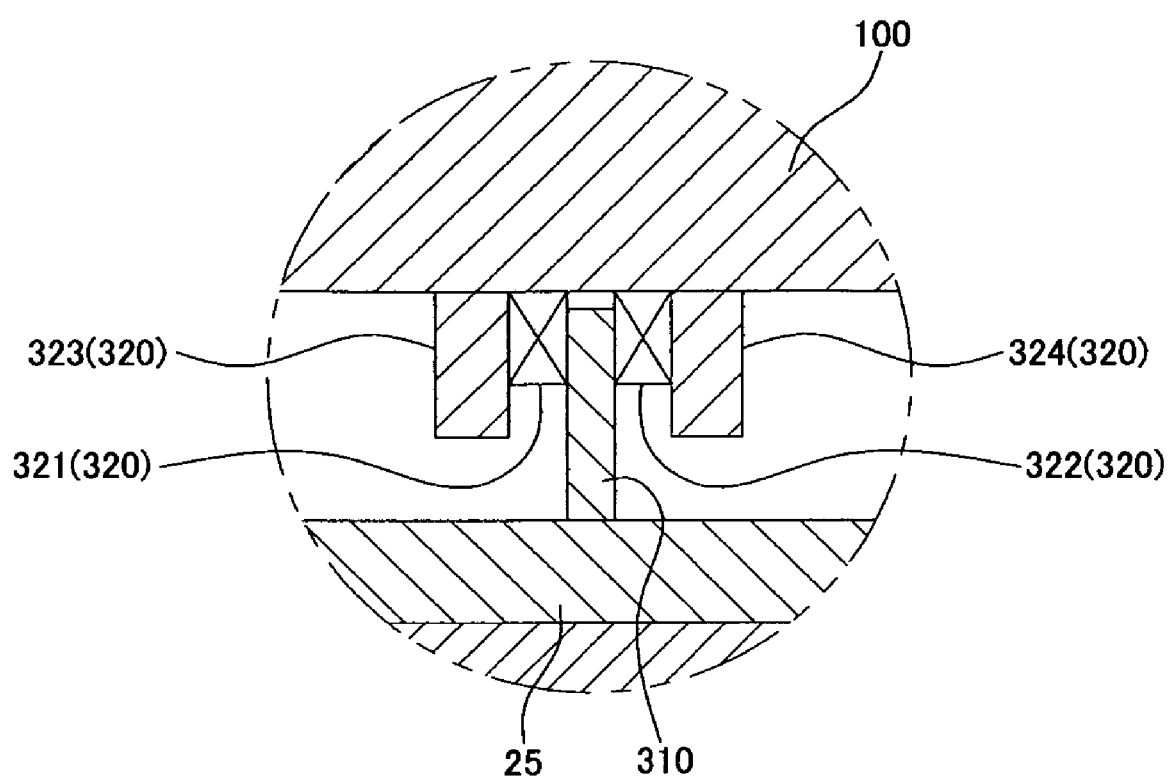
FIG. 3 is an enlarged view of "A" part in FIG. 2.

FIG. 2 is a cross-sectional view showing main components of an automatic transmission of a vehicle according to an exemplary embodiment of the present invention, and FIG. 3 is an enlarged view of "A" part in FIG. 2.

As shown in FIG. 2, an automatic transmission of a vehicle according to an exemplary embodiment of the present invention includes a case 100 forming an exterior of the automatic transmission, and a planetary gear set 20 in the case 100. In addition, the planetary gear set 20 includes a sun gear 21, a plurality of pinions 23, and a ring gear 25, The sun gear 21 is included at exterior circumference of a rotating shaft S, and it is located in order to make a concentric circle with the rotating shaft S. A plurality of pinions 23 are supported by a carrier (not shown), and engaged with an exterior circumference of the sun gear 21, and rotated along the exterior circumference of the sun gear 21. An interior circumference of the ring gear 25 is engaged with an exterior circumference of a plurality of pinion 23, and the ring gear 25 is rotated along an exterior circumference of a plurality of pinion 23. Accordingly, when one among the sun gear 21, carrier (not shown), and ring gear 25 is fixed, rotation speed and torque transmitted to an output shaft (not shown) can be changed.

The ring gear 25 is rotatably supported on an interior circumference of the case 100 by a supporting unit 300.

Hereinafter, the supporting unit 300 will be described in detail with reference to the drawings.

The supporting unit 300 may include a first member 310 located at an exterior circumference of the ring gear 25 and a second member 320 located on an interior circumference of the case 100 at a position corresponding to the first member 310 to guide rotation of the first member 310.

As shown in FIG. 3, the first member 310 may be a support flange formed on an exterior circumference of the ring gear 25, and the second member 320 may be a bearing that is located on an interior circumference of the case 100 and guides smooth rotation of the support flange 310. Although not shown in the drawings, even though the support flange 310 is formed on the interior circumference of the case 100 and the bearing 320 is formed on the exterior circumference of the ring gear 25, the function of the supporting unit 300, as described above, can be equally performed by the support flange 310 and bearing 320.

Therefore, since the ring gear 25 is rotatably supported on the interior circumference of the case 100 by the supporting unit 300, overall length of the automatic transmission can be reduced compared to conventional automatic transmissions.

In more detail, as shown FIG. 1, since conventional automatic transmissions have a ring gear 25 rotatably supported around a rotating shift S, they are required to have a structure wherein a support flange 30 protruded from the lateral side of the ring gear 25 is inserted into a thrust bearing 40 located around the rotating shaft S Particularly, since the conventional support flange 30 is bent several times and convexes into the right in the drawings in order to prevent interferences between the support flange 30 and other components in the ring gear 25, the overall length of the automatic transmission needs to be longer by a predetermined space wherein the supporting flange 30 and the thrust bearing 40 are located.

However, as shown in FIG. 2, since the automatic transmission according to an exemplary embodiment of the present invention includes the ring gear 25 rotatably supported on the interior circumference of the case by the supporting unit 300, it is not required to have the predetermined space L compared to conventional automatic transmissions. Therefore, the overall length of the automatic transmission can be reduced by the predetermined space L.

Furthermore, the bearing 320 may be a thrust bearing. As shown in FIG. 3, the thrust bearing 320 may include a first rotating portion 321 located to the left side of the support flange 310 below the case 100 and a second rotating portion 322 located to the right side of the support flange 310 so as to guide the smooth movement of the support flange 310. It also may include a first housing 323 located to the left side of the first rotating portion 321 below the case 100 and a second housing 324 located to the right side of the second rotating portion 322 so as to cover the first and second rotating portions. Therefore, axial movement of the ring gear 25 can be prevented.

As described above, an automatic transmission of a vehicle according to an exemplary embodiment of the present invention may have an advantage of reduced weight and manufacturing cost through decreased overall length.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An automatic transmission of a vehicle comprising:
   a rotating shaft;
   a sun gear located on a circumference of the rotating shaft;
   a plurality of pinions engaged with the sun gear and rotated along an exterior circumference of the sun gear;
   a ring gear configured to be rotated as inscribed with an exterior circumference of the plurality of pinions;
   a case forming an exterior of the automatic transmission; and
   a supporting unit between the ring gear and an interior circumference of the case,
   wherein the supporting unit comprises a first member located on an exterior circumference of the ring gear and a second member located on the interior circumference of the case at a position corresponding to the first member to guide rotation of the first member,
   and the first member is a support flange formed on the exterior circumference of the ring gear.

2. The automatic transmission of claim 1, wherein the supporting unit is configured for the ring gear to be rotatably supported on an interior circumference of the case.

3. The automatic transmission of claim 1, wherein the second member is a bearing that guides smooth rotation of the support flange.

4. The automatic transmission of claim 3, wherein the bearing is a thrust bearing that prevents axial movement of the ring gear.

5. The automatic transmission of claim 3, wherein the bearing comprises a first rotating portion located to the left side of the support flange and a second rotating portion located to the right side of the support flange.

6. The automatic transmission of claim 5, wherein the bearing further comprises a first housing located to the left side of the first rotating portion and a second housing located to the right side of the second rotating portion.

7. A motor vehicle comprising the automatic transmission of claim 1.

* * * * *